US012219482B2

(12) United States Patent
Miao et al.

(10) Patent No.: US 12,219,482 B2
(45) Date of Patent: Feb. 4, 2025

(54) TERMINAL STATE TRANSITION METHOD, NETWORK DEVICE AND TERMINAL (71) Applicant: DATANG MOBILE COMMUNICATIONS EQUIPMENT CO., LTD., Beijing (CN)

(72) Inventors: Deshan Miao, Beijing (CN); Meiying Yang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 107 days.

(21) Appl. No.: 17/280,808

(22) PCT Filed: Sep. 25, 2019

(86) PCT No.: PCT/CN2019/107776
§ 371 (c)(1),
(2) Date: Mar. 26, 2021

(87) PCT Pub. No.: WO2020/063654
PCT Pub. Date: Apr. 2, 2020

(65) Prior Publication Data
US 2021/0410067 A1  Dec. 30, 2021

(30) Foreign Application Priority Data
Sep. 27, 2018  (CN) .......................... 201811131916.5

(51) Int. Cl.
H04W 52/02 (2009.01)

(52) U.S. Cl.
CPC .............................. H04W 52/0229 (2013.01)

(58) Field of Classification Search
CPC ........... H04W 52/0229; H04W 52/028; H04W 52/0216; H04W 52/0235; H04W 76/27; Y02D 30/70
See application file for complete search history.

(56) References Cited

U.S. PATENT DOCUMENTS

| 5,852,669 A | 12/1998 | Eleftheriadis |
| 2011/0194471 A1* | 8/2011 | Kim ................. H04W 52/0235 370/311 |
| 2013/0301501 A1 | 11/2013 | Olvera-Hernandez et al. |

(Continued)

FOREIGN PATENT DOCUMENTS

| CN | 101034957 A | 9/2007 |
| CN | 103338500 A | 10/2013 |

(Continued)

OTHER PUBLICATIONS

First Office Action for Indian Patent Application 202127017218, issued on Feb. 9, 2022.

(Continued)

Primary Examiner — Marcos L Torres
(74) Attorney, Agent, or Firm — Ladas & Parry, LLP (57) ABSTRACT The present disclosure provides a terminal state transition method, a network device and a terminal. The method of the present disclosure includes: transmitting configuration information of a wakeup signal monitoring window to a terminal; in case of detecting arrival of data traffic, transmitting a wakeup signal in the wakeup signal monitoring window.

18 Claims, 6 Drawing Sheets (56) References Cited

U.S. PATENT DOCUMENTS

| | | | |
|---|---|---|---|
| 2014/0133375 | A1 | 5/2014 | McDiarmid et al. |
| 2015/0223149 | A1 | 8/2015 | Liu et al. |
| 2015/0365897 | A1 | 12/2015 | Hu et al. |
| 2016/0007406 | A1* | 1/2016 | Yi .................. H04W 24/02 370/252 |
| 2016/0374022 | A1 | 12/2016 | Ang et al. |
| 2018/0007734 | A1 | 1/2018 | Kela et al. |
| 2018/0027495 | A1* | 1/2018 | Song .................. G06F 1/3206 455/343.2 |
| 2018/0270756 | A1 | 9/2018 | Bhattad et al. |
| 2021/0127335 | A1* | 4/2021 | Rostami ............ H04W 52/0229 |
| 2021/0153120 | A1* | 5/2021 | Atungsiri .......... H04W 52/0219 |

FOREIGN PATENT DOCUMENTS

| | | |
|---|---|---|
| CN | 103582166 A | 2/2014 |
| CN | 104303586 A | 1/2015 |
| CN | 107820721 A | 3/2018 |
| CN | 108064057 A | 5/2018 |
| EP | 2917805 B1 | 1/2018 |
| KR | 20160114718 A | 10/2016 |
| WO | 2018136060 A1 | 7/2018 |

OTHER PUBLICATIONS

First Office Action for Korean Patent Application 10-2021-7012523 issued on Feb. 3, 2022, and its English Translation provided by Korean Patent Office.
"UE power consumption reduction by new physical signal/channel in NB-Iot" 3GPP TSG RAN WG1 Meeting #89 R1-1707571 Hangzhou, P.R. China May 15-19, 2017 Source: LG Electronics Agenda Item: 6.2.7.1.1.
Extended European Search Report from corresponding EP app. No. 19866590.3, dated Oct. 25, 2021, all pages.
"Downlink channel power efficiency for MTC", R1-1719351, 3GPP TSG-RAN WG1 Meeting #91, Reno, Nevada, USA, Nov. 27-Dec. 1, 2017, all pages.
On 'wake-up signal' for eFeMTC, R1-1801430, 3GPP TSG RAN WG1 Meeting #92, Athens, Greece, Feb. 26-Mar. 2, 2018, all pages.
"Downlink channel power efficiency for MTC", R1-1801483, 3GPP TSG RAN WG1 Meeting #92, Athens, Greece, Feb. 26-Mar. 2, 2018, all pages.
"Potential phy channel designs for NR unlicensed", R1-1804830, 3GPP TSG RAN WG1 Meeting #92bis, Sanya, China, Apr. 16-Apr. 20, 2018, all pages.
First Office Action and Search Report from CN app. No. 201811131916.5, dated Sep. 3, 2020, with English translation from Global Dossier, all pages.
First Office Action from TW app. No. 108134553, dated Sep. 9, 2021, with English translation from Global Dossier, all pages.
International Search Report from PCT/CN2019/107776, dated Dec. 24, 2019, with English translation from WIPO, all pages.
Written Opinion of the International Searching Authority from PCT/CN2019/107776, dated Dec. 24, 2019, with English translation from WIPO, all pages.
International Preliminary Report on Patentability from PCT/CN2019/107776, dated Mar. 23, 2021, with English translation from WIPO, all pages.
Second Office Action for European Patent Application 19866590.3, issued on Sep. 8, 2022 by the European Patent Office.
Office action from corresponding European Patent Application No. 19866590.3 dated Oct. 14, 2024 (5 pages).

* cited by examiner

TERMINAL STATE TRANSITION METHOD, NETWORK DEVICE AND TERMINAL

CROSS-REFERENCE TO RELATED APPLICATIONS

This application is the U.S. national phase of PCT Application PCT/CN2019/107776 filed on Sep. 25, 2019, which claims the priority of Chinese Application No. 201811131916.5, filed on Sep. 27, 2018, the disclosures of which are incorporated in their entireties by reference herein.

TECHNICAL HELD

The present disclosure relates to the field of communication application technologies, and in particular to a terminal state transition method, a network device and a terminal.

BACKGROUND

In the New Radio (NR) system of the 5th generation wireless system (5G), the power-saving design of a user equipment (UE, also referred as terminal) becomes very necessary. The main reason is that the 5G supports larger bandwidth and more complex services, and an optimized power-saving design can save power consumption of the terminal and extend battery life, thereby improving user experience. In the related art, a common power-saving method is to keep UE in a sleep state as much as possible. Specifically, when traffic arrives at a UE, the UE can switch to an active state; while when no traffic arrives at the UE, the UE enters a sleep state. A wakeup signal is an indication signal for the terminal to switch from the sleep state to the active state. However, in the related art, monitoring and resources of the wakeup signal are all periodic, such as binding with a transmission cycle of the discontinuous reception (DRX). The wakeup method based on the wakeup signal is also periodic, and the periodic wakeup method is not conducive to rapid change of the UE's operation state, and thus is not conducive to matching the user's actual service status.

SUMMARY

One object of the present disclosure is to provide a terminal state transition method, a network device and a terminal, which can solve problems that the method of periodically waking up terminals in the related art is not conducive to rapid change of the UE's operation state, and thus is not conducive to matching the users actual service status.

In order to achieve the above object, the present disclosure provides a terminal state transition method, applied to a network device, including:
transmitting configuration information of a wakeup signal monitoring window to a terminal;
in case of detecting arrival of data traffic, transmitting a wakeup signal in the wakeup signal monitoring window.

The transmitting configuration information of a wakeup signal monitoring window to a terminal, includes:
configuring the wakeup signal monitoring window according to the type of the wakeup signal;
transmitting configuration parameters of the configured wakeup signal monitoring window to the terminal, wherein the configuration parameters include time-frequency location information of the wakeup signal monitoring window and resource allocation information of the wakeup signal.

The configuring the wakeup signal monitoring window according to the type of the wakeup signal, includes:
in case that the type of the wakeup signal is an analog waveform, according to a length of the wakeup signal, configuring one or more wakeup signal monitoring windows in each time unit or configuring one wakeup signal monitoring window in every N1 time units, wherein N1 is an integer greater than 1; and/or,
in case that the type of the wakeup signal is a baseband configuring one wakeup signal monitoring window in every N2 time units; wherein N2 is an integer greater than or equal to 1, and the baseband signal includes at least one of a digital baseband sequence, a reference signal and a physical channel;
wherein the time unit is a slot in a radio transmission frame.

In case that the type of the wakeup signal is an analog waveform, when a length of the wakeup signal is less than one time unit, a time interval between two adjacent wakeup signal monitoring windows is less than or equal to one time unit.

The transmitting configuration parameters of the configured wakeup signal monitoring window to the terminal, includes: transmitting the configuration parameters of the configured wakeup signal monitoring window to the terminal through downlink control information (DCI) or sleep indication signal.

The transmitting the configuration parameters of the configured wakeup signal monitoring window to the terminal through downlink control information (DCI) or sleep indication signal, includes: transmitting time-frequency location information of the wakeup signal monitoring window to the terminal through the downlink control information (DCI) or the sleep indication signal.

After transmitting the wakeup signal in the wakeup signal monitoring window, the method further includes: transmitting a dedicated reference signal for synchronization and/or channel tracking in subsequent time-frequency resources of the wakeup signal monitoring window.

After transmitting the wakeup signal in the wakeup signal monitoring window, the method further includes: transmitting a sleep indication signal when completing data traffic transmission with the terminal.

In order to achieve the above object, the present disclosure provides a terminal state transition method, applied to a terminal, including:
obtaining configuration information of a wakeup signal monitoring window;
performing wakeup signal detection processing in the wakeup signal monitoring window according to the configuration information;
in case that a wakeup signal is detected in the wakeup signal monitoring window, entering a wakeup state from a non-wakeup state.

The obtaining configuration information of a wakeup signal monitoring window, includes:
according to configuration parameters of the wakeup signal monitoring window indicated by a network device, obtaining the configuration information of the wakeup signal monitoring window; wherein the configuration parameters include time-frequency location information of the wakeup signal monitoring window and resource allocation information of the wakeup signal; or, Obtaining time-frequency location information of the wakeup signal monitoring window through downlink control information (PCI) or a sleep indication signal transmitted by the network device; or,
  starting a first timer at an end position of the wakeup state, and obtaining time-frequency location information of the wakeup signal monitoring window according to a timing duration of the first timer.

After entering a wakeup state from a non-wakeup state, the method further includes: performing synchronization and/or channel tracking according to a dedicated reference signal.

After entering a wakeup state from a non-wakeup state, the method further includes: performing detection of physical downlink control channel (PDCCH) for scheduling data and performing transmission of data traffic.

After entering a wakeup state from a non-wakeup state, the method further includes: performing one or multiple radio resource management (RRM) measurements to generate an RRM measurement report.

The performing one or multiple radio resource management (RRM) measurements to generate an RRM measurement report, includes: performing average or filter processing on results of the multiple RRM measurements to obtain the RRM measurement report.

After entering a wakeup state from a non-wakeup state, the method further includes:
  in case that the sleep indication signal is received, entering the non-wakeup state from the wakeup state; or,
  in case that a timing duration of a second timer reaches a preset duration, entering the non-wakeup state from the wakeup state; or,
  in case that a remaining transmission time indicated by downlink control information (DCI) is zero, entering the non-wakeup state from the wakeup state; or,
  in case that information indicated by a load indication is empty, entering the non-wakeup state from the wakeup state.

In order to achieve the above object, the present disclosure provides a network device, including: a transceiver, a memory, a processor, and a program stored on the memory and executable on the processor; wherein the processor executes the program to perform the following steps:
  transmitting configuration information of a wakeup signal monitoring window to a terminal;
  in case of detecting arrival of data traffic, transmitting the wakeup signal in the wakeup signal monitoring window.

The processor executes the program to further perform the following steps:
  configuring the wakeup signal monitoring window according to the type of the wakeup signal;
  transmitting configuration parameters of the configured wakeup signal monitoring window to the terminal, wherein the configuration parameters include time-frequency location information of the wakeup signal monitoring window and resource allocation information of the wakeup signal.

The processor executes the program to further perform the following steps:
  in case that the type of the wakeup signal is an analog waveform, according to a length of the wakeup signal, configuring one or more wakeup signal monitoring windows in each time unit or configuring one wakeup signal monitoring window in every N1 time units, wherein N1 is an integer greater than 1; and/or,
  in case that the type of the wakeup signal is a baseband configuring one wakeup signal monitoring window in every N2 time units; wherein N2 is an integer greater than or equal to 1, and the baseband signal includes at least one of a digital baseband sequence, a reference signal and a physical channel;
  wherein the time unit is a slot in a radio transmission frame.

In case that the type of the wakeup signal is an analog waveform, when a length of the wakeup signal is less than one time unit, a time interval between two adjacent wakeup signal monitoring windows is less than or equal to one time unit.

The processor executes the program to further perform the following steps: transmitting the configuration parameters of the configured wakeup signal monitoring window to the terminal through downlink control information (DCI) or sleep indication signal.

The processor executes the program to further perform the following steps: transmitting time-frequency location information of the wakeup signal monitoring window to the terminal through the downlink control information (DCI) or the sleep indication signal.

The processor executes the program to further perform the following steps: transmitting a dedicated reference signal for synchronization and/or channel tracking in subsequent time-frequency resources of the wakeup signal monitoring window.

The processor executes the program to further perform the following steps: transmitting a sleep indication signal when completing data traffic transmission with the terminal.

In order to achieve the above object, the present disclosure provides a computer-readable storage medium, including a computer program stored thereon; wherein the computer program is executed by a processor to perform the steps of the foregoing terminal state transition method applied to the network device.

In order to achieve the above object, the present disclosure provides a terminal, including: a transceiver, a memory, a processor, and a program stored on the memory and executable on the processor; wherein the processor executes the program to perform the following steps:
  obtaining configuration information of a wakeup signal monitoring window;
  performing wakeup signal detection processing in the wakeup signal monitoring window according to the configuration information;
  in case that a wakeup signal is detected in the wakeup signal monitoring window, entering a wakeup state from a non-wakeup state.

The processor executes the program to further perform the following steps:
  according to configuration parameters of the wakeup signal monitoring window indicated by a network device, obtaining the configuration information of the wakeup signal monitoring window; wherein the configuration parameters include time-frequency location information of the wakeup signal monitoring window and resource allocation information of the wakeup signal; or,
  obtaining time-frequency location information of the wakeup signal monitoring window through downlink control information (DCI) or a sleep indication signal transmitted by the network device; or,
  starting a first tuner at an end position of the wakeup state, and obtaining time-frequency location information of the wakeup signal monitoring window according to a timing duration of the first timer.

The processor executes the program to further perform the following steps: performing synchronization and/or channel tracking according to a dedicated reference signal.

The processor executes the program to further perform the following steps: performing detection of physical downlink control channel (PDCCH) for scheduling data and performing transmission of data traffic.

The processor executes the program to further perform the following steps: performing one or multiple radio resource management (RRM) measurements to generate an RRM measurement report.

The processor executes the program to further perform the following steps: performing average or filter processing on results of the multiple RRM measurements to obtain the RRM measurement report.

The processor executes the program to further perform the following steps:

in case that the sleep indication signal is received, entering the non-wakeup state from the wakeup state; or, in case that a timing duration of a second timer reaches a preset duration, entering the non-wakeup state from the wakeup state; or, in case that a remaining transmission time indicated by downlink control information (DCI) is zero, entering the non-wakeup state from the wakeup state; or, in case that information indicated by a load indication is empty, entering the non-wakeup state from the wakeup state.

In order to achieve the above object, the present disclosure provides a computer-readable storage medium, including a computer program stored thereon; wherein the computer program is executed by a processor to perform the steps of the terminal state transition method applied to the terminal.

In order to achieve the above object, the present disclosure provides a network device, including:

a first transmission module configured to transmit configuration information of a wakeup signal monitoring window to a terminal;

a second transmission module configured to transmit a wakeup signal in the wakeup signal monitoring window in case of detecting arrival of data traffic.

In order to achieve the above object, the present disclosure provides a terminal, including:

an obtaining module configured to obtain configuration information of a wakeup signal monitoring window;

a detection module configured to perform wakeup signal detection processing in the wakeup signal monitoring window according to the configuration information;

a first state conversion module configured to, in case that a wakeup signal is detected in the wakeup signal monitoring window, enter a wakeup state from a non-wakeup state.

The embodiments of the present disclosure have the following beneficial effects:

In the foregoing technical solutions of the embodiments of the present disclosure, by transmitting configuration information of the wakeup signal monitoring window to the terminal and transmitting the wakeup signal in the wakeup signal monitoring window in case of detecting arrival of data traffic, the terminal enters the wakeup state from the non-wakeup state in case that the terminal detects the wakeup signal in the wakeup signal monitoring window. In the embodiment of the present disclosure, the wakeup signal is transmitted once the data traffic is reached, so that the terminal enters the wakeup state, thereby realizing a rapid change of the terminal's operation state, and then further matching the terminal's operation state with the user's actual service state.

DETAILED DESCRIPTION

In order to make technical problems to be solved, technical solutions and the advantages of the present disclosure more apparent, the present disclosure will be described hereinafter in a clear and complete manner in conjunction with the drawings and embodiments.

The main meaningless power consumption of a terminal lies in monitoring of physical downlink control channel (PDCCH). Since the terminal cannot predict arrivals of downlink data, a more conservative configuration is to allow UE to continuously monitor PDCCH in each slot, but actual service cannot be continuous, thus, the often do a lot of ineffective PDCCH monitoring, which consumes a lot of battery energy.

An effective power-saving technology is DRX, which is a downlink discontinuous reception technology, which is divided into two processes including: DRX_ON and DRX_OFF. The UE only detects PDCCH within DRX_ON time window and is in a sleep state during DRX-OFF. Such technology is applicable to both Radio Resource Control (RRC) connected state and RRC idle state. More specifically, in 5G NR, such technology may be applied in three states: RRC connected state (RRC_Connected), RRC inactive state (RRC_inactive) and RRC idle state (RRC_IDLE). The wakeup technology based on periodic DRX introduces wakeup signals on the basis of DRX. The main motivation is that when traffic is sparse (in many cases, there is no data in DRX-ON stages), UE still needs to perform DCCH detection, which cause unnecessary power consumption. The wakeup signal is usually transmitted before DRX-ON to notify the UE whether data arrives in a current or subsequent DRX cycle. If the UE detects the wakeup signal, the UE is waken up, otherwise the UE, continues keeping in the sleep state and does not need to be waken up to monitor PDCCH.

Since DRX configuration in the related art is periodic, DRX-ON and DRX-OFF have a preset time length, which is not conducive to matching of actual services. In case that a DRX cycle is too short, the power saving effect of the UE is limited; in case that the DRX cycle is too long, it will affect transmission delay of data packets as downlink data may arrive at any time.

Figure 1:
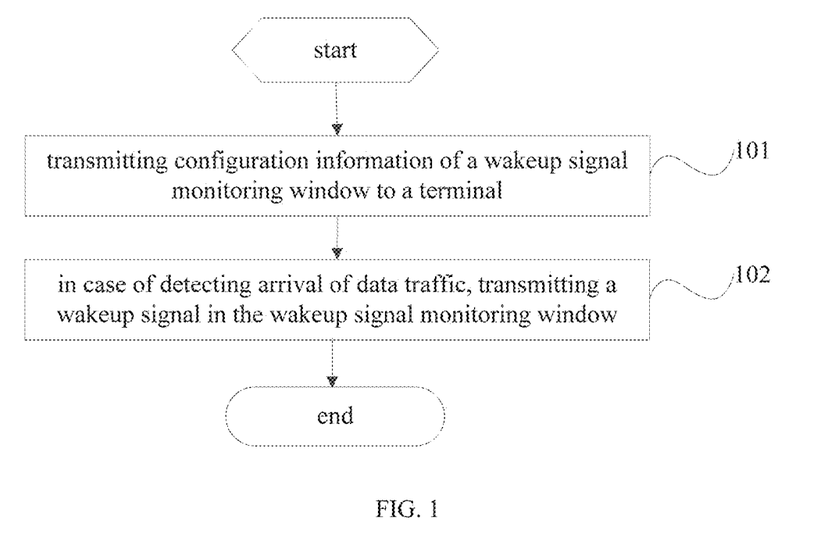
FIG. 1 is a first schematic flowchart of a terminal state transition method according to an embodiment of the present disclosure.

In view of this, one embodiment of the present disclosure provides a terminal state transition method, which is applied to a network device such as a base station. As shown in FIG. 1, the method includes the following steps.

Step 101: transmitting configuration information of a wakeup signal monitoring window to a terminal.

Here, the wakeup signal monitoring window may be periodic or aperiodic. The foregoing wakeup signal monitoring window may be semi-statically configured by the network device, or may be dynamically indicated by preset signaling.

In case that the foregoing wakeup signal monitoring window is semi-statically configured by the network device, the foregoing configuration information includes time-frequency location information of the wakeup signal monitoring window and resource allocation information of a wakeup signal.

In case that the foregoing wakeup signal monitoring window is dynamically indicated by preset signaling, the foregoing configuration information includes time-frequency location information of the wakeup signal monitoring window. Optionally, the foregoing configuration information further includes resource allocation information of a wakeup signal.

Each wakeup signal monitoring window includes at least one wakeup signal resource. Each wakeup signal resource includes one wakeup signal or multiple same wakeup signals (repetition of multiple wakeup signals). The foregoing wakeup signal is used to instruct the terminal to enter a wakeup state from a non-wakeup state. The non-wakeup state includes an inactive state or a sleep state. The wakeup state refers to an active state in which operations such as data reception or RRM measurement can be performed. The terminal is in the non-wakeup state in a non-wakeup signal monitoring window, and detects the wakeup signal only in a wakeup signal monitoring window.

The time-frequency location information of the wakeup signal monitoring window may be preset. That is, different wakeup signal monitoring windows may be semi-statically configured based on types of wakeup signals, or may be dynamically indicated through preset signaling, such as dynamically indicated through downlink control information (DCI) or sleep indication signal.

In the embodiments of the present disclosure, different types of wakeup signals are corresponding to different wakeup signal monitoring window configurations. The types of wakeup signals may include at least one of waveform, digital baseband sequence, reference signal, or physical channel.

Step 102: in case of detecting arrival of data traffic, transmitting a wakeup signal in the wakeup signal monitoring window.

Here, transmission of the wakeup signal is determined according to the arrival of the data traffic. In the terminal state transition method of the embodiment of the present disclosure, by transmitting configuration information of the wakeup signal monitoring window to the terminal and transmitting the wakeup signal in the wakeup signal monitoring window in case of detecting arrival of data traffic, the terminal enters the wakeup state from the non-wakeup state in case that the terminal detects the wakeup signal in the wakeup signal monitoring window. In the embodiment of the present disclosure, the wakeup signal is transmitted once the data traffic is reached, so that the terminal enters the wakeup state, thereby realizing a rapid change of the terminal's operation state, and then further matching the terminal's operation state with the user's actual service state.

Further, as an optional implementation, the transmitting configuration information of a wakeup signal monitoring window to a terminal of the foregoing step 101, includes:
according to a type of a wakeup signal, configuring the wakeup signal monitoring window;
transmitting configuration parameters of the configured wakeup signal monitoring window to the terminal, where the configuration parameters include time-frequency location information of the wakeup signal monitoring window and resource allocation information of the wakeup signal.

The resource allocation information refers to resource allocation information of the wakeup signal in the wakeup signal monitoring window. The time-frequency location information includes time-domain location information and frequency-domain location information. In the embodiments of the present disclosure, different types of wakeup signals are corresponding to different wakeup signal monitoring window configurations. The types of wakeup signals may include at least one of waveform, digital baseband sequence, reference signal or physical channel.

Specifically, in case that the type of the wakeup signal is an analog waveform, according to a length of the wakeup signal, one or more wakeup signal monitoring windows are configured in each time unit or one wakeup signal monitoring window is configured in every N1 time units, where N1 is an integer greater than 1.

The foregoing time unit is specifically a slot in a radio transmission frame.

Figure 2:
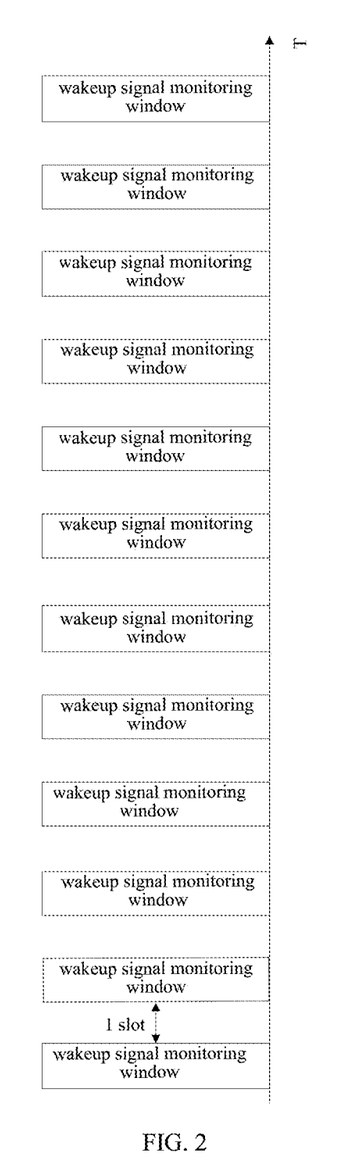
FIG. 2 is a first schematic diagram of a wakeup signal monitoring window according to an embodiment of the present disclosure.

For example, in case that a length of the wakeup signal is less than or equal to one slot, one or more wakeup signal monitoring windows may be configured in each time unit; in case that a length of the wakeup signal is greater than one slot, one wakeup signal monitoring window may be configured in every N1 time units. FIG. 2 is a schematic diagram showing that one wakeup signal monitoring window is configured in each time unit when a length of the wakeup signal is less than one slot.

In addition, in case that a monitoring period of the wakeup signal is very short, such as one slot, then, a low-power receiver is required, and a binary on-off keying modulation (OOK) waveform sequence is used as the wakeup signal, thereby ensuring that the UE is in a low-power consumption state.

In this implementation, different wakeup signal monitoring windows are semi-statically configured based on the types of wakeup signals. Generally, one wakeup signal monitoring window may be configured in every N time units, and location and an offset value (such as K slots) of a starting boundary of the wakeup signal may be indicated through RRC signaling.

N is a positive integer; K is greater than or equal to 0 and less than or equal to N−1.

And/or, in case that the type of the wakeup signal is a baseband signal, one wakeup signal monitoring window is configured in every N2 time units, where N2 is an integer greater than or equal to 1. The baseband signal includes at least one of a digital baseband sequence, a reference signal and a physical channel.

The time unit is a slot in a radio transmission frame.

Figure 3:
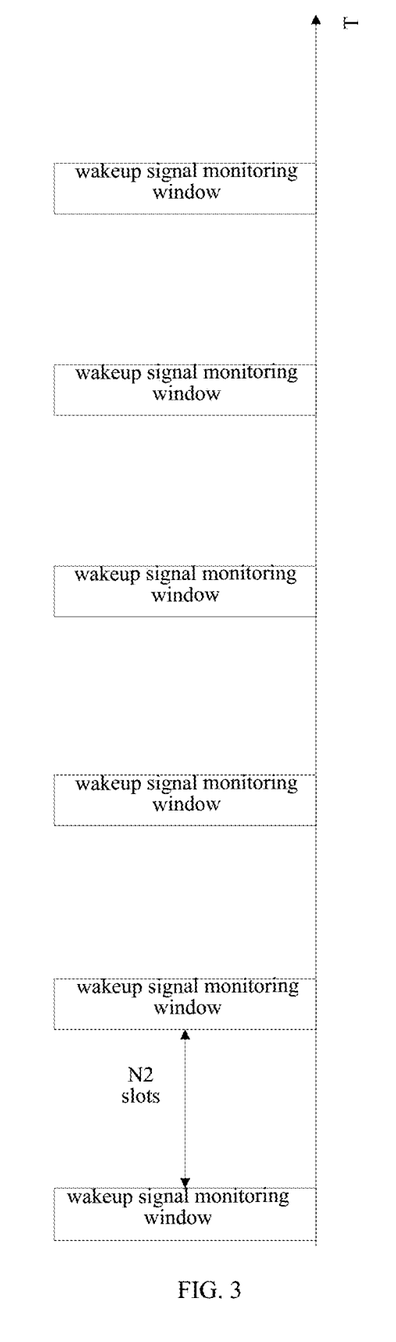
FIG. 3 is a second schematic diagram of a wakeup signal monitoring window according to an embodiment of the present disclosure.

FIG. 3 is a schematic diagram showing that one wakeup signal monitoring window is configured in every N2 time units when a length of the wakeup signal is less than one slot.

In addition, in case that a monitoring period of the wakeup signal is long, such as greater than one slot, then, the wakeup signal may use a reference signal or PDCCH. At this point, time domain resources of one or more symbols are defined as a transmission window of the wakeup signal.

Optionally, in case that the type of the wakeup signal is an analog waveform, when a length of the wakeup signal is less than one time unit, a time interval between two adjacent wakeup signal monitoring windows is less than or equal to one time unit.

Here, the time interval between two adjacent wakeup signal monitoring windows is configured to be less than or equal to one time unit, which can ensure that the terminal enters the wakeup state at any time.

As another optional implementation, the transmitting configuration information of a wakeup signal monitoring window to a terminal of the foregoing step 101, includes:

transmitting time-frequency location information of the wakeup signal monitoring window to the terminal through downlink control information (DCI) or sleep indication signal.

Optionally, in this implementation, resource allocation information of the wakeup signal may also be transmitted to the terminal through the downlink control information (DCI) or the sleep indication signal. The resource allocation information refers to resource allocation information of the wakeup signal in the wakeup signal monitoring window.

In this implementation, time-frequency location of each wakeup signal monitoring window is dynamically variable and is not preset. For example, DCI is used to indicate time or time-frequency location for a next detection of the wakeup signal, or time-frequency location of a next wakeup signal monitoring window is determined by a sleep indication signal at an end of the last active state, or a timer is started at an end position of the last active time and UE monitors the wakeup signal after the timers expires.

In addition, this implementation may also be combined with the foregoing implementation. For example, the sleep indication signal may indicate whether to detect the wakeup signal in a next preset monitoring window, or may instruct UE to skip detection in multiple consecutive wakeup signal monitoring windows.

Optionally, after transmitting the wakeup signal in the wakeup signal monitoring window, the method further includes:

transmitting a dedicated reference signal for synchronization and/or channel tracking in subsequent time-frequency resources of the wakeup signal monitoring window.

Further, after transmitting the wakeup signal in the wakeup signal monitoring window, the method further includes:

transmitting a sleep indication signal when completing data traffic transmission with the terminal.

The sleep indication signal is used to instruct the terminal to enter the non-wakeup state from the wakeup state. The sleep indication signal may be DCI or medium access control (MAC) signaling; or bits of the sleep indication signal are carried in the DCI or MAC signaling, or may also be carried in a physical downlink shared channel (PDSCH) or other physical signals.

As an alternative, the network device may further indicate remaining transmission time Ts through downlink control information. In case that the remaining transmission time Ts is 0 or in case that the remaining transmission time Ts is 0 after a period of time has passed from receiving the remaining transmission time Ts, the terminal automatically enters the sleep state. The network device may further instruct the terminal to enter the sleep state through a load indication. Specifically, in case that the load indication is empty, the terminal enters the sleep state.

In the embodiment of the present disclosure, the network device transmits the wakeup signal according to location of the wakeup signal resource and arrival of the data traffic, and the UE searches and monitors the wake-up signal according to the configured monitoring window. In case that the UE is in the active state, the base station no longer transmits a wakeup signal; meanwhile, the UE does not monitor the wakeup signal. The embodiments of the present disclosure can help the UE to track service changes in real time, and reduce monitoring of PDCCH as much as possible, and reduce consumption of battery energy.

In the terminal state transition method of the embodiment of the present disclosure, by transmitting configuration information of the wakeup signal monitoring window to the terminal and transmitting the wakeup signal in the wakeup signal monitoring window in case of detecting arrival of data traffic, the terminal enters the wakeup state from the non-wakeup state in case that the terminal detects the wakeup signal in the wakeup signal monitoring window. In the embodiment of the present disclosure, the wakeup signal is transmitted once the data traffic is reached, so that the terminal enters the wakeup state, thereby realizing a rapid change of the terminal's operation state, and then further matching the terminal's operation state with the user's actual service state.

Figure 4:
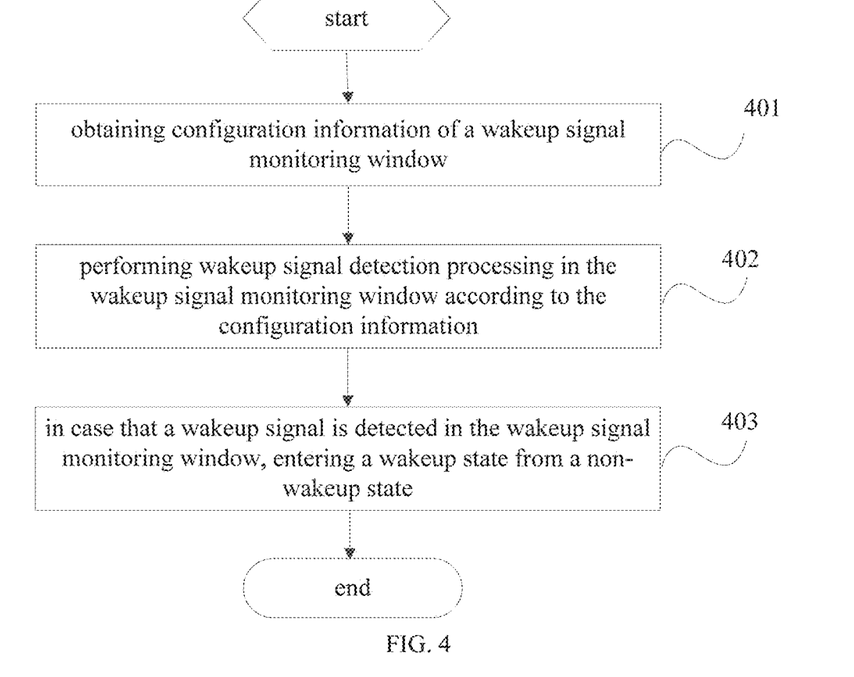
FIG. 4 is a second schematic flowchart of a terminal state transition method according to an embodiment of the present disclosure.

As shown in FIG. 4, one embodiment of the present disclosure further provides a terminal state transition method, which is applied to a terminal. The method includes the following steps.

Step 401: obtaining configuration information of a wakeup signal monitoring window.

Here, the wakeup signal monitoring window may be periodic or aperiodic. The foregoing wakeup signal monitoring window may be semi-statically configured by the network device, or may be dynamically indicated by preset signaling.

In case that the foregoing wakeup signal monitoring window is semi-statically configured by the network device, the foregoing configuration information includes time-frequency location information of the wakeup signal monitoring window and resource allocation information of a wakeup signal.

In case that the foregoing wakeup signal monitoring window is dynamically indicated by preset signaling, the foregoing configuration information includes time-frequency location information of the wakeup signal monitoring window. Optionally, the foregoing configuration information further includes resource allocation information of a wakeup signal.

Each wakeup signal monitoring window includes at least one wakeup signal resource. Each wakeup signal resource includes one wakeup signal or multiple same wakeup signals (repetition of multiple wakeup signals). The foregoing wakeup signal is used to instruct the terminal to enter a wakeup state from a non-wakeup state. The non-wakeup state includes an inactive state or a sleep state. The wakeup state refers to an active state in which operations such as data reception or RRM measurement can be performed. The terminal is in the non-wakeup state in a non-wakeup signal monitoring window, and detects the wakeup signal only in a wakeup signal monitoring window.

The time-frequency location information of the wakeup signal monitoring window may be preset. That is, different wakeup signal monitoring windows may be semi-statically configured based on types of wakeup signals, or may be dynamically indicated through preset signaling, such as dynamically indicated through downlink control information (DCI) or sleep indication signal.

In the embodiments of the present disclosure, different types of wakeup signals are corresponding to different wakeup signal monitoring window configurations. The types of wakeup signals may include at least one of waveform, digital baseband sequence, reference signal, or physical channel.

The step 401 specifically includes:
according to configuration parameters of the wakeup signal monitoring window indicated by the network device, obtaining the configuration information of the wakeup signal monitoring window; where the configuration parameters include time-frequency location information of the wakeup signal monitoring window and resource allocation information of the wakeup signal; or, obtaining time-frequency location information of the wakeup signal monitoring window through downlink control information (DCI) or sleep indication signal transmitted by the network device; or, starting a first timer at an end position of the wakeup state, and obtaining time-frequency location information of the wakeup signal monitoring window according to a timing duration of the first timer.

Specifically, the first timer is started at the end of the wakeup state; when the first timer expires, the wakeup signal is monitored. That is, time domain location information of the wakeup signal monitoring window is determined according to the end position of the wakeup state plus the timing duration of the first timer.

Step 402: performing wakeup signal detection processing in the wakeup signal monitoring window according to the configuration information.

Here, the terminal is in the non-wakeup state in a non-wakeup signal monitoring window, and detects the wakeup signal only in a wakeup signal monitoring window.

Step 403: in case that a wakeup signal is detected in the wakeup signal monitoring window, entering a wakeup state from a non-wakeup state.

Further, after entering a wakeup state from a non-wakeup state, the method further includes:
performing synchronization and/or channel tracking according to a dedicated reference signal.

Further, after entering a wakeup state from a non-wakeup state, the method further includes:
performing detection of physical downlink control channel (PDCCH) for scheduling data and performing transmission of data traffic.

Specifically, after performing synchronization and/or channel tracking according to the dedicated reference signal, PDCCH for scheduling data may be detected, and transmission of the data traffic may be performed.

Further, after entering a wakeup state from a non-wakeup state, the method further includes:
performing one or multiple radio resource management (RRM) measurements to generate an RRM measurement report.

Specifically, before performing one or multiple RRM measurements or during process of performing one or multiple RRM measurements, synchronization and/or channel tracking is performed according to a dedicated reference signal, and an RRM measurement report is generated.

The performing multiple radio resource management (RRM) measurements to generate an RRM measurement report, includes:
performing average or filter processing on results of the multiple RRM measurements to obtain the RRM measurement report.

Further, after entering a wakeup state from a non-wakeup state, the method further includes:
in case that the sleep indication signal is received, entering the non-wakeup state from the wakeup state.

The sleep indication signal is used to instruct the terminal to enter the non-wakeup state from the wakeup state. The sleep indication signal may be DCI or medium access control (MAC) signaling; or bits of the sleep indication signal are carried in the DCI or MAC signaling, or may also be carried in a physical downlink shared channel (PDSCH) or other physical signals.

Or, in case that a timing duration of a second timer reaches a preset duration, the terminal enters the non-wakeup state from the wakeup state.

A timing starting point of the second timer may be a slot where the last PDCCH or feedback ACK signal is received.

Or, in case that a remaining transmission time indicated by downlink control information (DCI) is zero, the terminal enters the non-wakeup state from the wakeup state.

The network device may further indicate remaining transmission time Ts through downlink control information. In case that the remaining transmission time Ts is 0 or in case that the remaining transmission time Ts is 0 after a period of time has passed from receiving the remaining transmission time Ts, the terminal automatically enters the sleep state.

Or, in case that information indicated by a load indication is empty, the terminal enters the non-wakeup state from the wakeup state.

The network device instructs the terminal to enter the sleep state through the load indication. In case that the load indication is empty, it indicates that there is no follow-up information, and then the terminal enters the sleep state.

Figure 5:
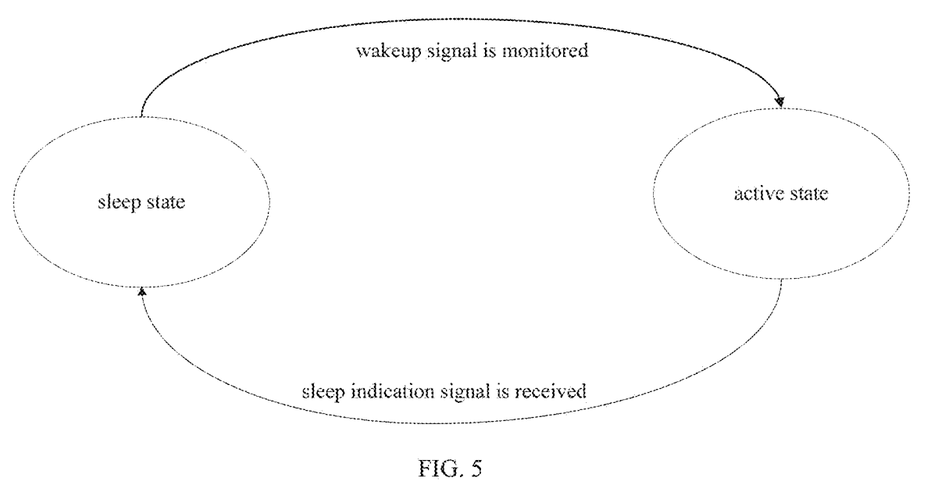
FIG. 5 is a schematic diagram of state transition according to an embodiment of the present disclosure.

In the embodiment of the present disclosure, the terminal continuously monitors the wakeup signal (an interval between wakeup signal monitoring windows is small, such as less than one slot). As shown in FIG. 5, in case that a wakeup signal is monitored, the terminal enters the active state from the sleep state; in case that a sleep indication signal is received, the terminal enters the sleep state from the active state. In this way, rapid change of operation states of the terminal is realized, which is conducive to matching the user's actual service status.

Figure 6:
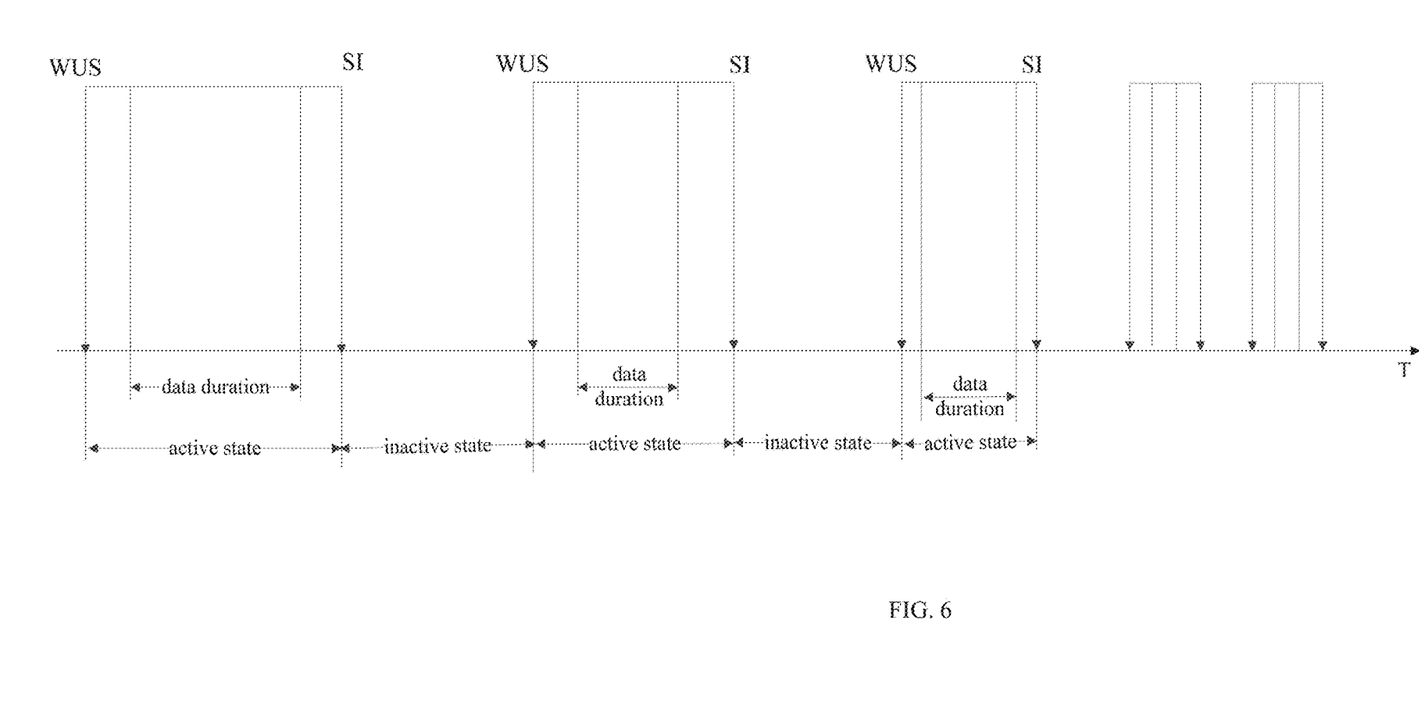
FIG. 6 is a schematic diagram of aperiodic wakeup according to an embodiment of the present disclosure.

An aperiodic wakeup process of the terminal in the RRC connected state according to one embodiment of the present disclosure is specifically described hereinafter with reference to FIG. 6.

In case that data traffic of a UE is burst and irregular, it is difficult for a base station to configure a periodic DRX to match an actual service process, thus it is necessary to use aperiodic DRX configuration. At this point, there is no configuration parameter of DRX, and only sleep and wakeup of the UE is dynamically controlled. It is needed to configure a wakeup signal and a sleep indication signal at the same time, to complete process conversion of aperiodic wakeup. FIG. 6 shows how to achieve matching process of aperiodic wake-up and burst traffic. Before each traffic arrives, the base station transmits a wakeup signal (WUS), and then the UE performs detection of the wakeup signal. After the UE detects the wakeup signal, the UE performs PDCCH detection and then performs data transmission. When the data transmission is completed, the base station needs to transmit a sleep indication signal (SI). The UE enters the sleep state after detecting the sleep indication. It can be seen that the actual data transmission time of the terminal, i.e., a duration of data transmission (Data duration), is less than a duration corresponding to the active state.

Figure 7:
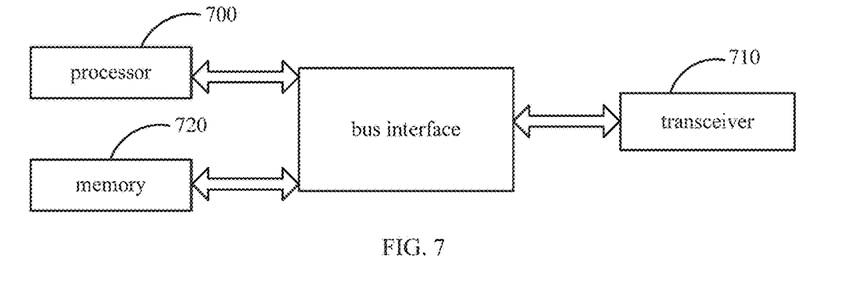
FIG. 7 is a structural block diagram of a network device according to an embodiment of the present disclosure.

As shown in FIG. 7, one embodiment of the present disclosure further provides a network device. The network device is specifically a base station, including a memory 720, a processor 700, a transceiver 710, a bus interface, and a computer program stored on the memory 720 and running on the processor 700. The processor 700 is configured to read the program in the memory 720 to perform the following processes:

transmitting configuration information of a wakeup signal monitoring window to a terminal;

in case of detecting arrival of data traffic, transmitting a wakeup signal in the wakeup signal monitoring window.

In FIG. 7, a bus architecture may include any number of interconnected buses and bridges. Specifically, various circuits of one or more processors, which are represented by the processor 700, and the storage, which is represented by the memory 720, are linked together. The bus architecture may link various other circuits, such as a peripheral device, voltage regulator and a power management circuit together. These features are well known in this field, therefore, this disclosure does not make further description on these features. The bus interface provides an interface. The transceiver 710 may be multiple elements, including a transmitter and a receiver and provide units, which communicate with other devices on the transmission medium. The processor 700 is responsible for managing the bus architecture and common processing, and the memory 720 may store data used by the processor 700 when executing the operations.

Optionally, the processor 700 executes the computer program to further perform the following steps:

according to a type of a wakeup signal, configuring the wakeup signal monitoring window;

transmitting configuration parameters of the configured wakeup signal monitoring window to the terminal, where the configuration parameters include time-frequency location information of the wakeup signal monitoring window and resource allocation information of the wakeup signal.

Optionally, the processor 700 executes the computer program to further perform the following steps:

in case that the type of the wakeup signal is an analog waveform, according to a length of the wakeup signal, configuring one or more wakeup signal monitoring windows in each time unit or configuring one wakeup signal monitoring window in every N1 time units, where N1 is an integer greater than 1;

and/or, in case that the type of the wakeup signal is a baseband configuring one wakeup signal monitoring window in every N2 time units; where N2 is an integer greater than or equal to 1, and the baseband signal includes at least one of a digital baseband sequence, a reference signal and a physical channel;

the time unit is a slot in a radio transmission frame.

Optionally, in case that the type of the wakeup signal is an analog waveform, when a length of the wakeup signal is less than one time unit, a time interval between two adjacent wakeup signal monitoring windows is less than or equal to one time unit.

Optionally, the processor 700 executes the computer program to further perform the following steps:

transmitting time-frequency location information of the wakeup signal monitoring window to the terminal through downlink control information (DCI) or sleep indication signal.

Optionally, the processor 700 executes the computer program to further perform the following steps:

transmitting a dedicated reference signal for synchronization and/or channel tracking in subsequent time-frequency resources of the wakeup signal monitoring window.

Optionally, the processor 700 executes the computer program to further perform the following steps:

transmitting a sleep indication signal when completing data traffic transmission with the terminal.

In the terminal state transition method of the embodiment of the present disclosure, by transmitting configuration information of the wakeup signal monitoring window to the terminal and transmitting the wakeup signal in the wakeup signal monitoring window in case of detecting arrival of data traffic, the terminal enters the wakeup state from the non-wakeup state in case that the terminal detects the wakeup signal in the wakeup signal monitoring window. In the embodiment of the present disclosure, the wakeup signal is transmitted once the data traffic is reached, so that the terminal enters the wakeup state, thereby realizing a rapid change of the terminal's operation state, and then further matching the terminal's operation state with the user's actual service state.

In some embodiments of the present disclosure, a computer-readable storage medium is further provided, on which a computer program is stored. The program is executed by a processor to perform the following steps:

transmitting configuration information of a wakeup signal monitoring window to a terminal;

in case of detecting arrival of data traffic, transmitting a wakeup signal in the wakeup signal monitoring window.

In case that the program is executed by the processor, it can implement all implementations in the foregoing method embodiment applied to the network device side. To avoid repetition, details are not described here.

Figure 8:
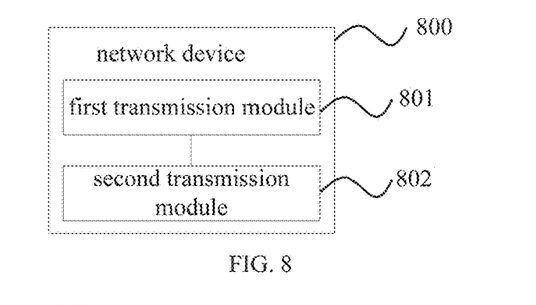
FIG. 8 is a schematic diagram of modules of a network device according to an embodiment of the present disclosure.

As shown in FIG. 8, one embodiment of the present disclosure further provides a network device 800, including:

a first transmission module 801 configured to transmit configuration information of a wakeup signal monitoring window to a terminal, a second transmission module 802 configured to transmit a wakeup signal in the wakeup signal monitoring window in case of detecting arrival of data traffic.

in the network device of the embodiment of the present disclosure, the first transmission module includes:

a configuration sub-module configured to configure the wakeup signal monitoring window according to a type of a wakeup signal;

a transmission submodule configured to transmit configuration parameters of the configured wakeup signal monitoring window to the terminal, where the configuration parameters include time-frequency location information of the wakeup signal monitoring window and resource allocation information of the wakeup signal.

In the network device of the embodiment of the present disclosure, the configuration submodule includes:
  a first configuration unit configured to, in case that the type of the wakeup signal is an analog waveform, according to a length of the wakeup signal, configure one or more wakeup signal monitoring windows in each time unit or configure one wakeup signal monitoring window in every N1 time units, where N1 is an integer greater than 1; and/or,
  a second configuration unit configured to, in case that the type of the wakeup signal is a baseband signal, configure one wakeup signal monitoring window in every N2 time units; where N2 is an integer greater than or equal to 1, and the baseband signal includes at least one of a digital baseband sequence, a reference signal and a physical channel;
  where the time unit is a slot in a radio transmission frame.

In the network device of the embodiment of the present disclosure, in case that the type of the wakeup signal is an analog waveform, when a length of the wakeup signal is less than one time unit, a time interval between two adjacent wakeup signal monitoring windows is less than or equal to one time unit.

In the network device of the embodiment of the present disclosure, the first transmission module is configured to transmit time-frequency location information of the wakeup signal monitoring window to the terminal through downlink control information (DCI) or sleep indication signal.

The network device of the embodiment of the present disclosure further includes:
  a second transmission module configured to, after transmitting the wakeup signal in the wakeup signal monitoring window, transmit a dedicated reference signal for synchronization and/or channel tracking in subsequent time-frequency resources of the wakeup signal monitoring window.

The network device of the embodiment of the present disclosure further includes:
  a third transmission module configured to, after transmitting the wakeup signal in the wakeup signal monitoring window, transmit a sleep indication signal when completing data traffic transmission with the terminal.

In the network device of the embodiment of the present disclosure, by transmitting configuration information of the wakeup signal monitoring window to the terminal and transmitting the wakeup signal in the wakeup signal monitoring window in case of detecting arrival of data traffic, the terminal enters the wakeup state from the non-wakeup state in case that the terminal detects the wakeup signal in the wakeup signal monitoring window. In the embodiment of the present disclosure, the wakeup signal is transmitted once the data traffic is reached, so that the terminal enters the wakeup state, thereby realizing a rapid change of the terminal's operation state, and then further matching the terminal's operation state with the user's actual service state.

Figure 9:
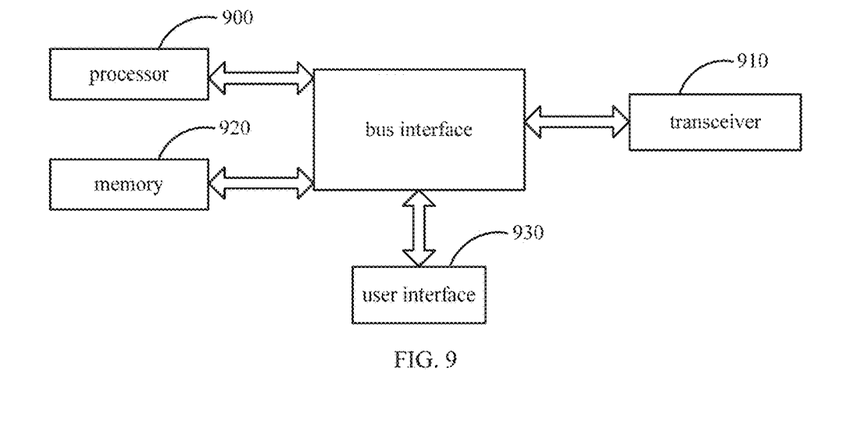
FIG. 9 is a structural block diagram of a terminal according to an embodiment of the present disclosure.

As shown in FIG. 9, one embodiment of the present disclosure further provides a terminal, including: a transceiver, a memory, a processor, and a computer program stored on the memory and executable on the processor. The processor executes the computer program to perform the following steps:
  obtaining configuration information of a wakeup signal monitoring window;
  performing wakeup signal detection processing in the wakeup signal monitoring window according to the configuration information;
  in case that a wakeup signal is detected in the wakeup signal monitoring window, entering a wakeup state from a non-wakeup state.

In FIG. 9, a bus architecture may include any number of interconnected buses and bridges. Specifically, various circuits of one or more processors, which are represented by the processor 900, and the storage, which is represented by the memory 920, are linked together. The bus architecture may link various other circuits, such as a peripheral device, voltage regulator and a power management circuit together. These features are well known in this field, therefore, this disclosure does not make further description on these features. The bus interface provides an interface. The transceiver 910 may be multiple elements, including a transmitter and a receiver and provide units, which communicate with other devices on the transmission medium. For different UEs, a user interface 930 may also be an interface capable of externally/internally connecting required devices which may include a keyboard, a monitor, a speaker, microphone, joystick.

The processor 900 is responsible for managing the bus architecture and common processing, and the memory 920 may store data used by the processor 900 when executing the operations.

Optionally, the processor 900 is further configured to read the program in the memory 920 to perform the following steps:
  according to configuration parameters of the wakeup signal monitoring window indicated by the network device, obtaining the configuration information of the wakeup signal monitoring window; where the configuration parameters include time-frequency location information of the wakeup signal monitoring window and resource allocation information of the wakeup signal; or,
  Obtaining time-frequency location information of the wakeup signal monitoring window through downlink control information (DCI) or sleep indication signal transmitted by the network device; or,
  starting a first timer at an end position of the wakeup state, and obtaining time-frequency location information of the wakeup signal monitoring window according to a timing duration of the first timer.

Optionally, the processor 900 is further configured to read the program in the memory 920 to perform the following steps:
  performing synchronization and/or channel tracking according to a dedicated reference signal.

Optionally, the processor 900 is further configured to read the program in the memory 920 to perform the following steps:
  performing detection of physical downlink control channel (PDCCH) for scheduling data and performing transmission of data traffic.

Optionally, the processor 900 is further configured to read the program in the memory 920 to perform the following steps:
  performing one or multiple radio resource management (RRM) measurements to generate an RRM measurement report.

Optionally, the processor 900 is further configured to read the program in the memory 920 to perform the following steps:

performing average or filter processing on results of the multiple RRM measurements to obtain the RRM measurement report.

Optionally, the processor 900 is further configured to read the program in the memory 920 to perform the following steps:
- in case that the sleep indication signal is received, entering the non-wakeup state from the wakeup state; or,
- in case that a timing duration of a second timer reaches a preset duration, entering the non-wakeup state from the wakeup state; or,
- in case that a remaining transmission time indicated by downlink control information (DO) is zero, entering the non-wakeup state from the wakeup state; or,
- in case that information indicated by a load indication is empty, entering the non-wakeup state from the wakeup state.

In the embodiment of the present disclosure, the terminal continuously monitors the wakeup signal (an interval between wakeup signal monitoring windows is small, such as less than one slot). In case that a wakeup signal is monitored, the terminal enters the active state from the steep state; in case that a sleep indication signal is received, the terminal enters the sleep state from the active state. In this way, rapid change of operation states of the terminal is realized, which is conducive to matching the user's actual service status.

In some embodiments of the present disclosure, a computer-readable storage medium is further provided, on which a computer program is stored. The program is executed by a processor to perform the following steps:
- obtaining configuration information of a wakeup signal monitoring window;
- performing wakeup signal detection processing in the wakeup signal monitoring window according to the configuration information;
- in case that a wakeup signal is detected in the wakeup signal monitoring window, entering a wakeup state from a non-wakeup state.

In case that the program is executed by the processor, it can implement all implementations in the foregoing method embodiment applied to the terminal side. To avoid repetition, details are not described here.

Figure 10:
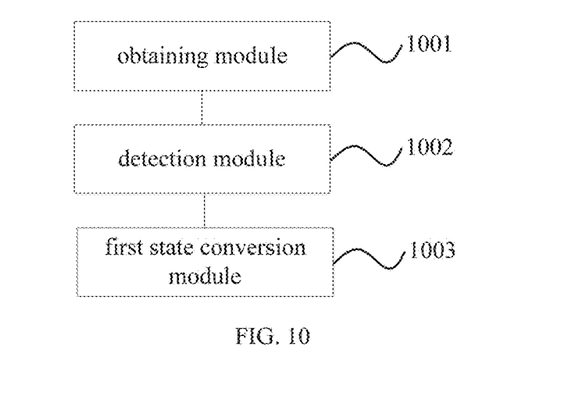
FIG. 10 is a schematic diagram of modules of a terminal according to an embodiment of the present disclosure.

As shown in FIG. 10, one embodiment of the present disclosure further provides a terminal, including:
- an obtaining module 1001 configured to obtain configuration information of a wakeup signal monitoring window;
- a detection module 1002 configured to perform wakeup signal detection processing in the wakeup signal monitoring window according to the configuration information;
- a first state conversion module 1003 configured to, in case that a wakeup signal is detected in the wakeup signal monitoring window, enter a wakeup state from a non-wakeup state.

In the terminal of the embodiment of the present disclosure, the obtaining module is configured to,
- according to configuration parameters of the wakeup signal monitoring window indicated by the network device, obtain the configuration information of the wakeup signal monitoring window; where the configuration parameters include time-frequency location information of the wakeup signal monitoring window and resource allocation information of the wakeup signal; or,
- obtain time-frequency location information of the wakeup signal monitoring window through downlink control information (DCI) or sleep indication signal transmitted by the network device; or,
- start a first timer at an end position of the wakeup state, and obtain time-frequency location information of the wakeup signal monitoring window according to a timing duration of the first timer.

The terminal of the embodiment of the present disclosure further includes:
- a synchronization module configured to perform synchronization and/or channel tracking according to a dedicated reference signal.

The terminal of the embodiment of the present disclosure further includes:
- a transmission module configured to perform detection of physical downlink control channel (PDCCH) for scheduling data and perform transmission of data traffic.

The terminal of the embodiment of the present disclosure further includes:
- a generation module configured to perform one or multiple radio resource management (RRM) measurements to generate an RRM measurement report.

In the terminal of the embodiment of the present disclosure, the generation module is configured to perform average or filter processing on results of the multiple RRM measurements to obtain the RRM measurement report.

The terminal of the embodiment of the present disclosure further includes:
- a second state conversion module configured to,
- in case that the sleep indication signal is received, enter the non-wakeup state from the wakeup state; or,
- in case that a timing duration of a second timer reaches a preset duration, enter the non-wakeup state from the wakeup state; or,
- in case that a remaining transmission time indicated by downlink control information (DCI) is zero, enter the non-wakeup state from the wakeup state; or,
- in case that information indicated by a load indication is empty, enter the non-wakeup state from the wakeup state.

In the embodiment of the present disclosure, the terminal continuously monitors the wakeup signal (an interval between wakeup signal monitoring windows is small, such as less than one slot). In case that a wakeup signal is monitored, the terminal enters the active state from the sleep state; in case that a sleep indication signal is received, the terminal enters the sleep state from the active state. In this way, rapid change of operation states of the terminal is realized, which is conducive to matching the user's actual service status.

In the various embodiments of the present disclosure, it should be understood that sequence numbers of the foregoing processes do not mean execution orders, and an execution order of each process should be determined by its function and internal logic, and should not constitute any limitation to the implementation process of the embodiments of the present disclosure.

Persons having ordinary skill in the art may obtain that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

Persons having ordinary skill in the art can understand that all or part of the processes in the foregoing method embodiments can be implemented by controlling relevant hardware through a computer program. The program may be stored in a computer readable storage medium. The program is executed to perform procedures of the foregoing method embodiments. The storage medium may be a magnetic disk, an optical disc, a read-only memory (ROM), or a random access memory (RAM), etc.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A terminal state transition method, performed by a network device, comprising:
   determining configuration information of a wakeup signal monitoring window according to a predetermined type of a wakeup signal and transmitting the configuration information to a terminal;
   in response to that arrival of data traffic is detected, transmitting the wakeup signal in the wakeup signal monitoring window;
   wherein the determining configuration information of the wakeup signal monitoring window includes:
   in response to that the type of the wakeup signal is an analog waveform, selecting a value of N1, and according to a length of the wakeup signal, configuring one or more wakeup signal monitoring windows in each time unit or one wakeup signal monitoring window in every N1 time units, wherein N1 is an integer greater than 1; wherein the time unit is a slot in a radio transmission frame; and/or,
   in response to that the type of the wakeup signal is a baseband signal, selecting a value of N2, and configuring one wakeup signal monitoring window in every N2 time units; wherein N2 is an integer greater than or equal to 1, and the baseband signal includes at least one of a digital baseband sequence, a reference signal and a physical channel; wherein the time unit is a slot in a radio transmission frame.

2. The terminal state transition method according to claim 1, wherein the determining configuration information of the wakeup signal monitoring window according to the predetermined type of the wakeup signal and transmitting the configuration information to a terminal, includes:
   configuring the wakeup signal monitoring window according to the type of the wakeup signal;
   transmitting configuration parameters of the configured wakeup signal monitoring window to the terminal, wherein the configuration parameters include time-frequency location information of the wakeup signal monitoring window and resource allocation information of the wakeup signal.

3. The terminal state transition method according to claim 1, wherein in response to that the wakeup signal is an analog signal, and a length of the wakeup signal is less than one time unit, a time interval between two adjacent wakeup signal monitoring windows is less than or equal to one time unit.

4. The terminal state transition method according to claim 2, wherein the transmitting configuration parameters of the configured wakeup signal monitoring window to the terminal, includes:

transmitting the configuration parameters of the configured wakeup signal monitoring window to the terminal through downlink control information (DCI) or sleep indication signal.

5. The terminal state transition method according to claim 4, wherein the transmitting the configuration parameters of the configured wakeup signal monitoring window to the terminal through downlink control information (DCI) or sleep indication signal, includes:

transmitting time-frequency location information of the wakeup signal monitoring window to the terminal through the downlink control information (DCI) or the sleep indication signal.

6. The terminal state transition method according to claim 1, wherein after transmitting the wakeup signal in the wakeup signal monitoring window, the method further includes:

transmitting a dedicated reference signal for synchronization and/or channel tracking in subsequent time-frequency resources of the wakeup signal monitoring window; or, transmitting a sleep indication signal when completing data traffic transmission with the terminal.

7. A terminal state transition method, performed by a terminal, comprising:

obtaining configuration information of a wakeup signal monitoring window;

performing wakeup signal detection processing in the wakeup signal monitoring window according to the configuration information;

in response to that the wakeup signal is detected in the wakeup signal monitoring window, entering a wakeup state from a non-wakeup state;

wherein the configuration information of the wakeup signal monitoring window includes:

in response to that the type of the wakeup signal is an analog waveform, according to a length of the wakeup signal, one or more wakeup signal monitoring windows is configured in each time unit or one wakeup signal monitoring window is configured in every N1 time units, wherein N1 is an integer greater than 1; wherein the time unit is a slot in a radio transmission frame; and/or, in response to that the type of the wakeup signal is a baseband signal, one wakeup signal monitoring window is configured in every N2 time units; wherein N2 is an integer greater than or equal to 1, and the baseband signal includes at least one of a digital baseband sequence, a reference signal and a physical channel; wherein the time unit is a slot in a radio transmission frame;

wherein values of N1 and N2 are selected by the network device according to service conditions.

8. The terminal state transition method according to claim 7, wherein the obtaining configuration information of a wakeup signal monitoring window, includes:

according to configuration parameters of the wakeup signal monitoring window indicated by a network device, obtaining the configuration information of the wakeup signal monitoring window; wherein the configuration parameters include time-frequency location information of the wakeup signal monitoring window and resource allocation information of the wakeup signal; or, obtaining time-frequency location information of the wakeup signal monitoring window through downlink control information (DCI) or a sleep indication signal transmitted by the network device; or, starting a first timer at an end position of the wakeup state, and obtaining time-frequency location information of the wakeup signal monitoring window according to a timing duration of the first timer.

9. The terminal state transition method according to claim 7, wherein after entering a wakeup state from a non-wakeup state, the method further includes:

performing synchronization and/or channel tracking according to a dedicated reference signal.

10. The terminal state transition method according to claim 7, wherein after entering a wakeup state from a non-wakeup state, the method further includes:

performing detection of physical downlink control channel (PDCCH) for scheduling data and performing transmission of data traffic.

11. The terminal state transition method according to claim 7, wherein after entering a wakeup state from a non-wakeup state, the method further includes:

performing one or multiple radio resource management (RRM) measurements to generate an RRM measurement report.

12. The terminal state transition method according to claim 11, wherein the performing one or multiple radio resource management (RRM) measurements to generate an RRM measurement report, includes:

performing average or filter processing on results of the multiple RRM measurements to obtain the RRM measurement report.

13. The terminal state transition method according to claim 7, wherein after entering a wakeup state from a non-wakeup state, the method further includes:

in response to that the sleep indication signal is received, entering the non-wakeup state from the wakeup state; or, in response to that a timing duration of a second timer reaches a preset duration, entering the non-wakeup state from the wakeup state; or, in response to that a remaining transmission time indicated by downlink control information (DCI) is zero, entering the non-wakeup state from the wakeup state; or, in response to that information indicated by a load indication is empty, entering the non-wakeup state from the wakeup state.

14. A terminal, comprising: a transceiver, a memory, a processor, and a program stored on the memory and executable on the processor; wherein the processor executes the program to perform the steps of the terminal state transition method according to claim 7.

15. A network device, comprising: a transceiver, a memory, a processor, and a program stored on the memory and executable on the processor; wherein the processor executes the program to perform the following steps:

determining configuration information of a wakeup signal monitoring window according to a predetermined type of a wakeup signal and transmitting the configuration information to a terminal;

in response to that arrival of data traffic is detected, transmitting the wakeup signal in the wakeup signal monitoring window;

wherein the determining configuration information of the wakeup signal monitoring window includes:
in response to that the type of the wakeup signal is an analog waveform, selecting a value of N1, and according to a length of the wakeup signal, configuring one or more wakeup signal monitoring windows in each time unit or one wakeup signal monitoring window in every N1 time units, wherein N1 is an integer greater than 1; wherein the time unit is a slot in a radio transmission frame; and/or,
in response to that the type of the wakeup signal is a baseband signal, selecting a value of N2, and configuring one wakeup signal monitoring window in every N2 time units; wherein N2 is an integer greater than or equal to 1, and the baseband signal includes at least one of a digital baseband sequence, a reference signal and a physical channel; wherein the time unit is a slot in a radio transmission frame.

16. The network device according to claim 15, wherein the processor executes the program to further perform the following steps:
configuring the wakeup signal monitoring window according to the type of the wakeup signal;
transmitting configuration parameters of the configured wakeup signal monitoring window to the terminal, wherein the configuration parameters include time-frequency location information of the wakeup signal monitoring window and resource allocation information of the wakeup signal.

17. The network device according to claim 16, wherein the processor executes the program to further perform the following steps:
transmitting the configuration parameters of the configured wakeup signal monitoring window to the terminal through downlink control information (DCI) or sleep indication signal; or,
transmitting time-frequency location information of the wakeup signal monitoring window to the terminal through the downlink control information (DCI) or the sleep indication signal.

18. The network device according to claim 15, wherein the processor executes the program to further perform the following steps:
transmitting a dedicated reference signal for synchronization and/or channel tracking in subsequent time-frequency resources of the wakeup signal monitoring window; or,
transmitting a sleep indication signal when completing data traffic transmission with the terminal.

* * * * *